United States Patent [19]

Wray

[11] Patent Number: 4,686,151

[45] Date of Patent: Aug. 11, 1987

[54] SUBSTRATE MATERIAL FOR MAGNETIC RECORDING MEDIA

[75] Inventor: Daniel X. Wray, Canoga Park, Calif.

[73] Assignee: Dynamic Disk, Carlsbad, Calif.

[21] Appl. No.: 721,310

[22] Filed: Apr. 9, 1985

[51] Int. Cl.[4] ............................................. B21C 37/00
[52] U.S. Cl. .................................... 428/607; 428/652; 428/928
[58] Field of Search ............... 428/606, 607, 652, 928; 360/135

[56] References Cited

U.S. PATENT DOCUMENTS

| | | | |
|---|---|---|---|
| 3,321,328 | 5/1967 | Koretzky | 428/928 |
| 3,634,209 | 1/1972 | Wolf et al. | 204/40 |
| 4,254,189 | 3/1981 | Fisher | 428/626 |
| 4,287,225 | 9/1981 | Kneller et al. | 427/48 |
| 4,323,629 | 4/1982 | Kunieda et al. | 428/457 |
| 4,351,010 | 9/1982 | Arai | 360/131 |
| 4,430,387 | 2/1984 | Nakagawa et al. | 428/579 |
| 4,438,066 | 3/1984 | Aboaf et al. | 420/435 |
| 4,454,195 | 6/1984 | Fukuda | 428/336 |
| 4,456,661 | 6/1984 | Yamamoto | 428/607 |
| 4,469,566 | 9/1984 | Wray | 204/23 |
| 4,550,062 | 10/1985 | Takayama et al. | 428/611 |

FOREIGN PATENT DOCUMENTS 60-21507 2/1985 Japan ..................... 428/928

OTHER PUBLICATIONS

A Dictionary of Metallurgy, 1958, p. 19.

*Primary Examiner*—John P. Sheehan
*Attorney, Agent, or Firm*—Spensley Horn Jubas & Lubitz

[57] ABSTRACT

An enhanced substrate for magnetic data storage devices incorporating a metallic thin film magnetic recording medium attached to the substrate by wet plating processes. In one embodiment the substrate is composed of a single phase alloy. The substrate can then be processed by conventional magnetic data storage device fabrication procedures with the resultant storage device having fewer surface coating irregularities and magnetic characteristic inconsistencies than conventional magnetic data storage devices. In an alternative embodiment a layer of a single phase alloy is first deposited onto a conventional substrate. The single phase alloy may be incorporated in both rigid storage devices where a magnetic data read-write head floats above the surface of the storage device or flexible magnetic storage devices in which the read-write head is in intimate contact with the storage device.

25 Claims, 2 Drawing Figures

SUBSTRATE MATERIAL FOR MAGNETIC RECORDING MEDIA

BACKGROUND OF THE INVENTION

1. Field of the Invention

The present invention concerns storage devices for magnetically recorded data and more particularly magnetic data storage devices employing a magnetic recording media made of a thin metallic film.

2. Description of the Prior Art

A wide variety of electronic instruments such as the increasingly common computer presently store data magnetically. Continuing improvements in the ability of these instruments to handle and manipulate increasing amounts of data in shorter time spans has correspondingly produced a need for storing data in ever increasing density on various types of magnetic data storage devices. As an example, it has become possible in recent years to store over eighty megabytes of data on one form of computer storage device (a 5¼ inch "Winchester" type hard disk) having the same data storage area as previous devices on which only five megabytes could be stored.

While available in a variety of forms, two of the more common types of magnetic data storage devices are those in which a magnetic data read/write head floats above the surface of a rapidly spinning rigid disk (Winchester type) and those in which the read/write head is in intimate contact with either a tape or a flexible disc (commonly called a floppy type disk). In either form, magnetic data is typically stored in a layer of magnetic recording media attached by various methods to some type of rigid or flexible substrate.

Typically a magnetic recording media layer is composed of either finely dispersed magnetically sensitive particles suspended in a polymeric binder or simply a continuous magnetically sensitive metallic thin film. Metallic thin films typically possess a greater density of magnetically sensitive material and, consequently, generally provide a greater data storage density.

Typically a metallic thin film magnetic recording media is applied to a substrate by either a "wet process" in which the metallic film is deposited on the substrate by a chemical plating process such as, for example, electroplating or electroless plating techniques or by a "dry process" such as vacuum evaporation, sputter coating, and ion plating techniques. In the case of dry processes, it is generally necessary to incline a target substrate at an extreme angle sometimes greater than eighty degrees to the direction of incidence of the metallic magnetic recording media vapor during the thin film deposition. Since the vapor impinges almost parallel to the substrate, the deposition rate becomes extremely slow with a resultant decrease in productivity and subsequent increase in cost.

In the case of wet processes, a certain number of imperfections are encountered in the uniformity of the metallic thin film coating and in the consistency of certain magnetic characteristics of the thin film coating such as remenance and coercivity. Data densities have now generally reached the point where the magnetic media surface area employed per unit of data stored is approaching the size of these defects. When a magnetic read/write head employed in such critical areas encounters one of these defects, errors occur in the data being stored on or read from the magnetic data storage device. Thus, there exists a need for improved magnetic data storage devices employing thin metallic films applied by a wet process with few or no coating inconsistencies or unintended variations in the magnetic characteristics of the thin film.

Previous efforts have been made to reduce the number of defects in a magnetic data storage device incorporating a metallic thin film. U.S. Pat. No. 4,254,189 to Fisher, for example, proposes the use of an intermediate plastic bonding layer between the substrate and a metallic thin film magnetic recording media to provide a smoother bonding surface for the thin film by filling in and masking topographical defects in the substrate. This approach, while providing a smoother surface, still allows for bonding defects between a metallic thin film and the smooth bonding layer. As another example, U.S. Pat. No. 4,430,387 to Nakagawa proposes the use of a 99.999% pure layer of aluminum having an anodized exterior surface to provide a better bonding surface for metallic thin films applied by sputter coating. An anodized surface layer, however, cannot be used in connection with metallic thin films applied by wet processes.

Thus there still exists a need for magnetic data storage devices incorporating metallic thin film magnetic recording media applied by wet chemical processes with few or no thin film coating defects.

SUMMARY OF THE INVENTION

It is therefore an object of the present invention to provide a substrate for a magnetic data storage device permitting the application of a metallic thin film magnetic recording media by wet processes with the resultant metallic thin film having few or no surface coating inconsistencies or inhomogeneities in its magnetic characteristics. This and other goals and objectives are accomplished in the present invention by providing a single phase metallic alloy surface on the substrate onto which either a metallic thin film magnetic recording media or intermediary bonding of layers are attached.

In one preferred embodiment of the present invention a layer of a single phase metallic alloy is applied to the exterior surface of a conventional substrate. In an alternative preferred embodiment the single phase metallic alloy surface is provided by fabricating the entire substrate out of a single phase metallic alloy.

The novel features which are believed to be characteristic of the present invention, together with further objectives and advantages thereof, will be better understood from the following detailed description considered in connection with the accompanying drawings. It should be expressly understood, however, that the drawings are for purposes of illustration and description only and are not intended as a definition of the limits of the invention.

DETAILED DESCRIPTION

Figure 1:
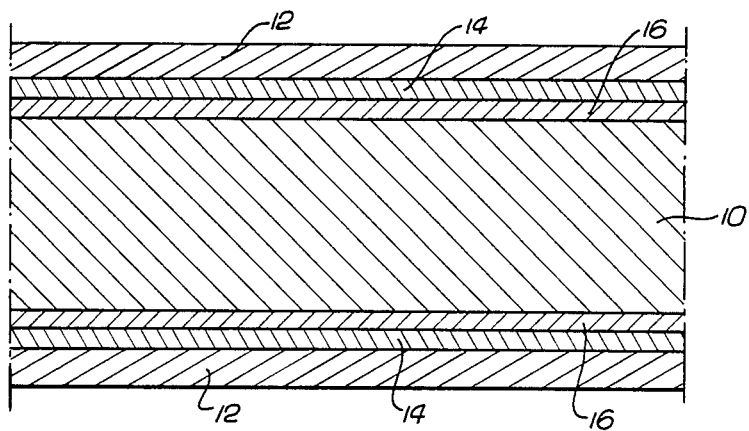
FIG. 1 is a sectional view of a portion of one preferred embodiment of the present invention in which a single phase alloy is applied to the surface of a conventional substrate.

Referring to the drawings, and more particularly FIG. 1 thereof, there is shown one preferred embodiment of the present invention directed to a rigid Winchester type magnetic data storage disk including a conventional substrate 10 to which an appropriate metallic thin film magnetic recording media layer 12 is attached. The metallic thin film 12 may be applied to both sides of the substrate, as shown in FIG. 1 or, alternatively, applied to only one side of the substrate. The substrate 10 may be composed of any number of metallic alloys in common useage for magnetic data storage applications. These alloys often, though not exclusively, include a high percentage of aluminum. A fine grain paramagnetic alloy layer 14 may also be applied to the substrate surface to enhance the smoothness of the surface to which the metallic thin film layer 12 is attached. Typically this paramagnetic layer is a nickel alloy. Where the substrate alloy has a high aluminum content, a layer of zinc (not shown) is usually applied to the substrate surface before deposition of the paramagnetic layer 14 to assist in the deposition of the paramagnetic alloy.

In this preferred embodiment of the present invention, a single phase metallic alloy layer 16 is first deposited onto the surface of the substrate 10. The deposition process typically depends on the type of substrate and single phase alloy employed. Typically it is necessary to employ a dry deposition process. Thereafter, one or more subsequent layers may be deposited onto the substrate following conventional wet process magnetic data storage disk fabrication procedures. By way of example only, a paramagnetic layer 14 could be applied over the single phase alloy layer 16 with a metallic thin film layer 12 subsequently deposited onto the surface of the paramagnetic layer 14 to provide the storage device shown in FIG. 1. Depending on the type of single phase alloy employed, an interfacial layer 15 such as zinc could be deposited directly onto the surface of the single phase alloy layer 16 to assist in the deposition of the paramagnetic layer 14.

Typical wet process metallic thin film deposition techniques are well known in the art and need not be discussed at length in this specification. These processes include but are not limited to electroplating and electroless plating procedures. One example of a wet process for the deposition of a metallic thin film magnetic recording media is set forth in U.S. Pat. No. 4,469,566 to Wray.

Deposition of the single phase alloy layer 16 onto the substrate 10 has been found to dramatically enchance the uniformity of the metallic thin film magnetic recording media coating and to allow better control over certain magnetic characteristics of the metallic thin film layer such as remenance and coercivity. In one instance, a single phase alloy composed of 99.9% pure aluminum was coated to a thickness of 25 micro inches onto one side of a standard 5½ inch diameter type 5086 aluminum alloy magnetic data storage disk substrate. The disk was then processed in accordance with the procedure set forth in U.S. Pat. No. 4,469,566. Subsequent testing of the resulting disk on a model Three Phoenix 3PX352 testing device with a 0.7 mil read/write head tracking 1000 data tracks per radial inch on the disk showed less than 10 data errors on the treated side of the disk.

It is presently thought that the use of a single phase alloy surface on the substrate enhances wet process plating procedures by providing a plating surface having a uniform composition. For example, in the wet process plating of zinc onto a conventional aluminum magnesium alloy substrate, the layer of zinc necessary for subsequent plating over the substrate cannot be plated onto beta phase material present on the substrate surface. The resulting defects in the zinc layer coating preclude subsequent uniform coating with most conventional paramagnetic layers, such as those composed of nickel alloys. By producing a single phase alloy surface on the substrate a more uniform zinc layer can be deposited. During subsequent plating procedures a more uniform electrical current density can then be maintained, thereby permitting improved control of lattice crystal growth during, for example, a nickel alloy paramagnetic layer deposition. Similarly, uniformity of the electrical current density during the wet process plating of a metallic thin film magnetic recording media is essential to the maintenance of desired values of such magnetic characteristics as coercivity and remenance.

Obviously other single phase alloys in addition to 99.9% pure aluminum could be employed. By way of example only, other single phase alloys include but are not limited to such compositions as: (1) 2% or less of magnesium and 98% or more of aluminum, (2) 35-50% by weight of magnesium and 65-50% by weight of aluminum, (3) 98% magnesium and 2% aluminum, (4) 98.7% aluminum and 1.3% zinc, (5) 33% copper and 67% aluminum, and (6) 99.28% aluminum and 0.72% chromium, as well as a variety of other single phase alloys having negligible aluminum content.

Figure 2:
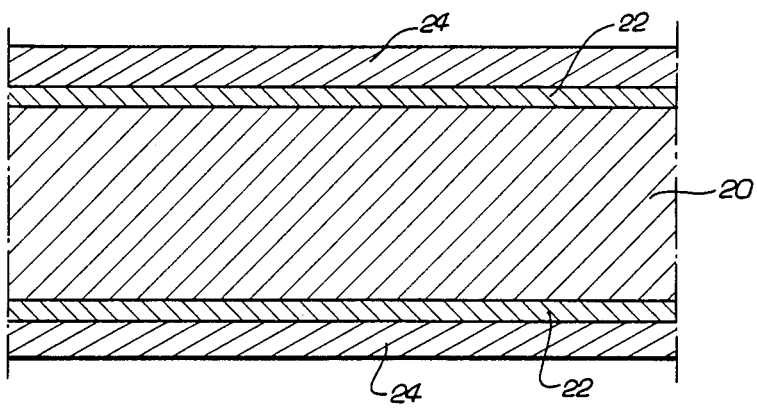
FIG. 2 is a sectional view of a portion of another preferred embodiment of the present invention in which the substrate itself is composed of a single phase alloy.

In FIG. 2 an alternative embodiment of the present inventive substrate is shown. In this embodiment the entire substrate 20 is composed of a single phase alloy. Depending upon the single phase alloy selected, a fine grain paramagnetic alloy layer 22 may also be deposited onto the substrate 20 before application of a metallic thin film layer 24. If a high aluminum content single phase alloy such as any of those set forth above is employed, an interfacial layer of zinc 21 (not shown) may be applied to the surface of the substrate 22 by conventional procedures before deposition of the paramagnetic alloy layer 22 or metallic thin film layer 24. By way of example, a magnetic data storage disk having few metallic thin film defects or magnetic characteristic irregularities could be fabricated by using a single phase alloy substrate 20 composed of 98% aluminum and 2% magnesium and subsequently processed in accordance with any number of wet process fabrication procedures such as the procedure set forth in U.S. Pat. No. 4,469,566.

A single phase alloy surface can similarly be provided for wet process plating of a metallic thin film magnetic recording media onto non-metallic substrates employed in the fabrication of rigid magnetic data storage disks as well. Conventional fabrication processes for these disks usually include the deposition of a metallic bonding layer onto the non-metallic substrate. This bonding layer could either be composed of a single phase alloy or, alternatively, a single phase alloy could be deposited onto the exterior surface of a conventional metallic bonding layer already affixed to the non-metallic substrate Any number of single phase alloys including the exemplary list discussed above could conceivably employed in connection with non-metallic substrates.

Metallic thin film magnetic recording media defects can also be minimized in magnetic data storage devices employing a flexible substrate by incorporating a single phase alloy. In the case of flexible metallic substrates, the substrate itself could simply be composed of a single phase alloy. Alternatively, a single phase alloy could be deposited as a thin film onto a conventional flexible metallic substrate. Similarly, for flexible non-metallic substrates, a single phase alloy could be used as a metallic bonding layer or a single phase alloy could be deposited as a thin film over a conventional metallic bonding layer.

By minimizing surface defects in the coating uniformity or magnetic characteristics of metallic thin film magnetic recording media layers, data storage densities can be increased through the use of smaller surface areas on a magnetic data storage device for the storage of individual elements of data. Thus the reduction of metallic thin film defects by the application of a single phase alloy coating can assist in achieving increased data densities.

It will, of course, be understood that modifications of the present invention and its various aspects will be apparent to those skilled in the art. Thus, the scope of the present invention should not be limited by the particular embodiments and examples described herein, but should only be defined by the appended claims and equivalents thereof.

What is claimed is:

1. A magnetic data storage device comprising:
   a substrate composed of a single phase metal; and
   a metallic thin film magnetic data storage medium attached to said substrate by a wet plating process; wherein said substrate is a rigid disk composed of at least approximately 98% aluminum and not more than approximately 2% magnesium.

2. A magnetic data storage device comprising:
   a substrate composed of a single phase metal; and
   a metallic thin film magnetic data storage medium attached to said substrate by a wet plating process; wherein said substrate is a rigid disk composed of between approximately 50-65% aluminum and between approximately 50-35% magnesium.

3. A magnetic data storage device comprising:
   a substrate composed of a single phase metal; and
   a metallic thin film magnetic data storage medium attached to said substrate by a wet plating process; wherein said substrate is a rigid disk composed of approximately 2% aluminum and approximately 98% magnesium.

4. A magnetic data storage device comprising:
   a substrate composed of a single phase metal; and
   a metallic thin film magnetic data storage medium attached to said substrate by a wet plating process; wherein said substrate is a rigid disk composed of approximately 98.7% aluminum and approximately 1.3% zinc.

5. A magnetic data storage device comprising:
   a substrate composed of a single phase metal; and
   a metallic thin film magnetic data storage medium attached to said substrate by a wet plating process; wherein said substrate is a rigid disk composed of approximately 67% aluminum and approximately 33% copper.

6. A magnetic data storage device comprising:
   a substrate composed of a single phase metal; and
   a metallic thin film magnetic data storage medium attached to said substrate by a wet plating process; wherein said substrate is a rigid disk composed of approximately 99.28% aluminum and approximately 0.72% chromium.

7. A magnetic data storage device comprising:
   a substrate composed of a single phase metal; and
   a metallic thin film magnetic data storage medium attached to said substrate by a wet plating process; wherein said substrate is a rigid disk composed of at least approximately 98% aluminum and not more than approximately 2% magnesium.

8. A magnetic data storage device comprising:
   a substrate composed of a single phase metal; and
   a metallic thin film magnetic data storage medium attached to said substrate by a wet plating process; wherein said substrate is a rigid disk composed of between approximately 50-65% aluminum and between approximately 50-35% magnesium.

9. A magnetic data storage device comprising:
   a substrate composed of a single phase metal; and
   a metallic thin film magnetic data storage medium attached to said substrate by a wet plating process; wherein said substrate is a flexible foil composed of approximately 2% aluminum and approximately 98% magnesium.

10. A magnetic data storage device comprising:
    a substrate composed of a single phase metal; and
    a metallic thin film magnetic data storage medium attached to said substrate by a wet plating process; wherein said substrate is a flexible foil composed of approximately 98.7% aluminum and approximately 1.3% zinc.

11. A magnetic data storage device comprising:
    a substrate composed of a single phase metal; and
    a metallic thin film magnetic data storage medium attached to said substrate by a wet plating process; wherein said substrate is a flexible foil composed of approximately 67% aluminum and approxiamtely 33% copper.

12. A magnetic data storage device comprising:
    a substrate composed of a single phase metal; and
    a metallic thin film magnetic data storage medium attached to said substrate by a wet plating process; wherein said substrate is a flexible foil composed of approximately 99.28% aluminum and approximately 0.72% chromium.

13. A magnetic data storage device comprising:
    a substrate;
    a single phase metal film attached to said substrate; and
    a metallic thin film magnetic data recording media deposited onto said single phase metal film; wherein said substrate is a rigid disk and said single phase metal film is composed of at least approximately 98% aluminum and not more than approximately 2% magnesium.

14. A magnetic data storage device comprising:
    a substrate;
    a single phase metal film attached to said substrate; and
    a metallic thin film magnetic data recording media deposited onto said single phase metal film; wherein said substrate is a rigid disk and said single phase metal is composed of approximately 50-65% aluminum and between approximately 50-35% magnesium.

15. A magnetic data storage device comprising:
    a substrate;
    a single phase metal film attached to said substrate; and
    a metallic thin film magnetic data recording media deposited onto said single phase metal film; wherein said substrate is a rigid disk and said single phase metal film is composed of approximately 2% aluminum and approximately 98% magnesium.

16. A magnetic data storage device comprising:

A substrate;
a single phase metal film attached to said substrate; and
a metallic thin film magnetic data recording media deposited onto said single phase metal film; wherein said substrate is a rigid disk and said single phase metal film is composed of approximately 98.7% aluminum and approximately 1.3% zinc.

17. A magnetic data storage device comprising:
a substrate;
a single phase metal film attached to said substrate; and
a metallic thin film magnetic data recording media deposited onto said single phase metal film; wherein said substrate is a rigid disk and said single phase metal film is composed of approximately 67% aluminum and approximately 33% copper.

18. A magnetic data storage device comprising:
a substrate;
a single phase metal film attached to said substrate; and
a metallic thin film magnetic data recording media deposited onto said single phase metal film; wherein said substrate is a rigid disk and said single phase metal film is composed of approximately 99.28% aluminum and approximately 0.72% chromium.

19. A magnetic data storage device comprising:
a substrate;
a single phase metal film attached to said substrate; and
a metallic thin film magnetic data recording media deposited onto said single phase metal film; wherein said substrate is a rigid disk and said single phase metal film is an alloy which does not include aluminum.

20. A magnetic data storage device comprising:
a substrate;
a single phase metal film attached to said substrate; and
a metallic thin film magnetic data recording media deposited onto said single phase metal film; wherein said substrate is a flexible structure and said single phase metal film is composed of approximately 98% aluminum and not more than approximately 2% magnesium.

21. A magnetic data storage device comprising:
a substrate;
a single phase metal film attached to said substrate; and
a metallic thin film magnetic data recording media deposited onto said single phase metal film; wherein said substrate is a flexible structure and said single phase metal film is composed of between approximately 50-65% aluminum and between approximately 50-35% magnesium.

22. A magnetic data storage device comprising:
a substrate;
a single phase metal film attached to said substrate; and
a metallic thin film magnetic data recording media deposited onto said single phase metal film; wherein said substrate is a flexible structure and said single phase metal film is composed of approximately 2% aluminum and approximately 98% magnesium.

23. A magnetic data storage device comprising:
a substrate;
a single phase metal film attached to said substrate; and
a metallic thin film magnetic data recording media deposited onto said single phase metal film; wherein said substrate is a flexible structure and said single phase metal film is composed of approximately 98.7% aluminum and approximately 1.3% zinc.

24. A magnetic data storage device comprising:
a substrate;
a single phase metal film attached to said substrate; and
a metallic thin film magnetic data recording media deposited onto said single phase metal film; wherein said substrate is a flexible structure and said single phase metal film composed of approximately 67% aluminum and approximately 33% copper.

25. A magnetic data storage device comprising:
a substrate;
a single phase metal film attached to said substrate; and
a metallic thin film magnetic data recording media deposited onto said single phase metal film; wherein said substrate is a flexible structure and said single phase metal film is composed of approximately 99.28% aluminum and approximately 0.72% chromium.

* * * * *